United States Patent [19]

Pearce et al.

[11] 4,316,482

[45] Feb. 23, 1982

[54] DIAPHRAGM VALVES

[75] Inventors: Michael I. Pearce, South Glamorgan; Glyn Cocking, Gwent, both of Wales

[73] Assignee: Saunders Valve Company Limited, Gwent, Wales

[21] Appl. No.: 59,171

[22] Filed: Jul. 20, 1979

[30] Foreign Application Priority Data

Jul. 25, 1978 [GB] United Kingdom ............... 30953/78

[51] Int. Cl.³ ............................................. F16K 43/00
[52] U.S. Cl. ..................................... 137/315; 251/14; 251/63.6; 251/331; 137/556
[58] Field of Search ....................... 137/315, 553, 556; 251/14, 62, 63.5, 63.6, 335 A, 331

[56] References Cited

U.S. PATENT DOCUMENTS

| | | | |
|---|---|---|---|
| 2,199,549 | 5/1940 | Saunders | 251/63.6 |
| 2,431,283 | 11/1947 | Spence | 251/14 |
| 3,026,081 | 3/1962 | Rossi | 251/14 |
| 3,378,224 | 4/1968 | Boyle | 251/63.6 |
| 3,385,561 | 5/1968 | Whalen | 251/14 |
| 3,451,423 | 6/1969 | Priese | 251/63.5 |

FOREIGN PATENT DOCUMENTS 1436749  5/1976  United Kingdom ................. 251/14

Primary Examiner—George L. Walton
Attorney, Agent, or Firm—Scrivener, Clarke, Scrivener and Johnson

[57] ABSTRACT

A diaphragm valve comprises a valve sub-assembly including a diaphragm secured to a valve body by a clamping member. The clamping member is provided with screw threads on to which a drive assembly is screwed to complete the valve. The drive assembly may be a piston and cylinder drive assembly or a handwheel drive assembly. An indicator module to provide an indication of whether the valve is open or closed can be incorporated between the clamping member and the drive assembly. The drive assembly can be removed for service or interchanged without disturbing the fluid seal between the diaphragm and the valve body.

11 Claims, 6 Drawing Figures

DIAPHRAGM VALVES

This invention relates to fluid flow control valves of the diaphragm valve type.

In known diaphragm valves the periphery of the closure diaphragm is sandwiched between a flange formed around the diaphragm opening of the valve body and a flange on the lower end of the bonnet which houses the actuating mechanism of the valve. Suitable means, for example bolts or studs, extend between the body flange and the bonnet flange to hold the bonnet in position and provide a clamping force sufficient to maintain fluid tight contact between the diaphragm and the body. The actuating mechanism may be any one of several types. For example, a hand wheel may be provided rotationally fast with a spindle which is in screw-threaded engagement with the bonnet and rotationally coupled to a compressor secured to the diaphragm such that rotation of the hand wheel causes axial movement of the spindle and corresponding movement of the compressor and diaphragm. Alternatively, a power operated actuator, for example a compressed air operated actuator, may be provided. In such known valves the bonnet used is individual to the actuating mechanism it houses or supports, and accordingly a different bonnet is necessary for each different type of actuating mechanism. This arrangement has several disadvantages. For example, a manufacturer must hold in stock a large range of different bonnets each corresponding to a different actuating mechanism assembly. Also, the mechanical connection which secures the bonnet to the valve body also serves to provide the clamping force holding the diaphragm in sealing contact with the body. Accordingly, each time the bonnet is removed, for example for service or in order to change from one type of actuating mechanism to another, the fluid seal between the diaphragm and the valve body is broken and line fluid can escape from the valve body. In use this means that the fluid system in which the valve is incorporated must be drained down each time before a bonnet is removed from a valve.

According to one feature of the present invention there is provided a diaphragm valve comprising a valve body defining a flow passage and a diaphragm opening; a diaphragm closing the diaphragm opening and movable between a closed position in which the diaphragm is in engagement with a seat formed in the flow passage to close the flow passage to fluid flow and an open position in which the diaphragm is spaced from the seat and the passage is open to fluid flow; a diaphragm clamping member secured to the valve body and clamping the periphery of the diaphragm in fluid-tight contact with the surface of the body surrounding the diaphragm opening; an operating member in engagement with the diaphragm and mounted for axial movement relative to the clamping member towards the seat to move the diaphragm towards the closed position; and a drive assembly releasably secured to the clamping member and including a drive member for driving the operating member towards the seat to move the diaphragm towards the closed position.

With an embodiment of valve according to the present invention the clamping member which secures the diaphragm to the valve body remains permanently in position and the drive assembly is releaseably secured to the clamping member to complete the actuating mechanism. As a result, the basic valve sub-assembly of valve body, diaphragm, clamping member, and operating member can be common to a range of different drive assemblies, different complete valves being formed by adding the desired drive assembly to the basic valve sub-assembly. The valve sub-assemblies can be mass produced relatively cheaply, and individual orders for valves with particular actuating mechanisms can be completed simply by adding the appropriate drive assembly to the basic valve sub-assembly. Further, the drive assembly can be removed from the valve for example for service or for substitution with another drive assembly without disturbing the seal between the diaphragm and the valve body, and accordingly without the previous requirement for draining down a system in which the valve is incorporated.

In some applications where a continuous relatively high line pressure is contemplated the valve will be "self-opening" that is to say when no closing force is applied to the operating member line pressure will be sufficient to hold the diaphragm in the open position. However, in general it will be preferable to provide a return spring biasing the valve into the open position. Such a return spring can conveniently be a compression spring located between the clamping member and the operating member. With this arrangement during closing of the valve the drive member abuts the operating member to drive the diaphragm towards the closed position against the bias of the return spring, and during opening of the valve the return spring causes the operating member to remain in abuttment with the drive member as the drive member is moved away from the valve seat.

The drive assembly may be releasably secured to the clamping member by means of inter-engaging screw threads on the drive assembly and the clamping member, or by other suitable inter-engaging means, for example screws, bolts, a bayonet fitting or studs and nuts. Further, whilst the drive assembly may be releaseably secured directly to the clamping member various modules may be inserted between the drive assembly and the clamping member if desired. For example, an indicator module comprising a clear plastic sleeve and an indicator member visible within the sleeve and movable with the operating member may be provided secured directly to the clamping member, the drive assembly being secured to the indicator module. Additionally or alternatively an accessory module can be positioned between the drive assembly and the clamping member. The accessory module may comprise a hollow cylindrical body having no affect on the operation of the valve but providing suitable mounting positions for various components, for example pilot valves, counters, solenoid valves and position detectors.

The above and further features and advantages of the present invention will become clear from the following description of preferred embodiments thereof, given by way of example only, reference being had to the accompanying drawings, wherein.

Figure 1:
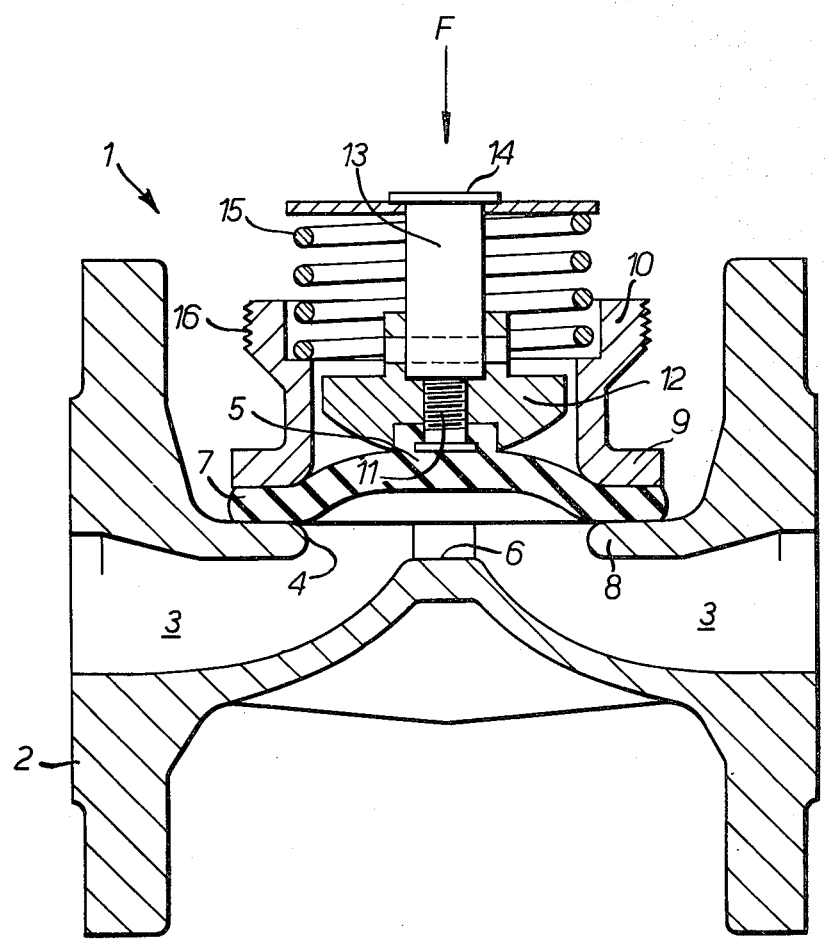
FIG. 1 is an axial sectional view of a valve sub-assembly.

Referring to FIG. 1, the valve sub-assembly 1 shown comprises a valve body 2 defining a flow passage 3 and a diaphragm opening 4. A diaphragm 5 closes the diaphragm opening 4 and is movable between a closed position in engagement with a seat 6 formed in the flow passage 3 and the open position shown in FIG. 1.

The periphery 7 of the diaphragm is sandwiched between a flange 8 on the valve body and a flange 9 on a clamping member 10. The clamping member 10 is secured to the body flange 8 by means of studs and nuts (not shown) and holds the lower face of the periphery 7 of the diaphragm in sealing engagement with the body flange.

The diaphragm is coupled by means of a stud 11 to a diaphragm compressor 12 which is mounted for nonrotational sliding movement within the clamping member 10. An operating member 13 is coupled to the compressor 12 so that a force F applied to the end face 14 of the operating member 13 moves the diaphragm from the open position shown in the drawings to the closed position in engagement with seat 6. A return spring 15 is located between a shoulder formed on the clamping member and a plate secured to the upper end of the operating member to bias the operating member upwardly as viewed in FIG. 1, i.e. to bias the valve into the open position.

The exterior surface of the upper end of the clamping member 10 is provided with screw threads 16 by means of which a suitable drive assembly is mounted on the valve sub-assembly 1 to form a complete valve.

Figure 2:
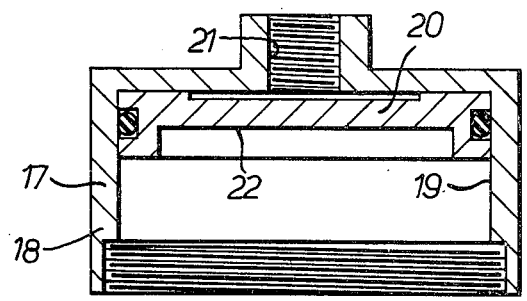
FIG. 2 is a sectional view of a piston module.

Referring to FIG. 2 a piston and cylinder drive assembly or module 17 is shown. The drive assembly includes a body 18 the lower end of which is open and is formed with screw threads for engagement with the screw threads 16 of the valve sub-assembly to mount the drive assembly thereon. A cylinder 19 is defined in the body 18 and a piston 20 is slidably mounted within the cylinder. A threaded connection 21 allows operating fluid, for example compressed air, to be admitted to the cylinder 19 to drive the piston along the cylinder. When the drive assembly is mounted on the valve sub-assembly the end face 14 of the operating member 13 abuts the under face 22 of the piston 20. Movement of the piston 20 along the cylinder 19 in response to the admission of compressed air to the cylinder moves the operating member 13 to close the valve against the bias of return spring 15. When the pressure in the cylinder 19 is relieved the return spring 15 moves the diaphragm towards the open position, driving the piston along the cylinder towards the connection 21.

If desired, rather than coupling the drive assembly 17 directly to the clamping member 10, the drive assembly 17 can be coupled to an indicator module 23 (FIG. 3) which in turn is coupled to the clamping member. The indicator module 23 includes a clear body 24 of, for example, perspex having threads 25 complementary to the threads of the drive assembly 17 and threads 26 complementary to the threads 16 of the clamping member. The indicator module 23 includes a spacer 27 one end of which abuts the under face 22 of the piston in the drive assembly 17, and the other end of which abuts the end face 14 of the operating member 13. A web 28 extends outwardly from the spacer 27 and supports a brightly coloured skirt 29. When the valve is in the open position the drive assembly 17 and indicator module 23 are in the configuration shown in FIG. 3 and the skirt 29 is not visable through the body 24. However, as the piston 20 is forced along the cylinder 19 to close the valve more and more of the skirt 29 becomes visable through the body 24 until when the valve is fully closed the entire skirt is visable through the body 24 providing a visual indication that the valve is closed.

It will be noted that a particular advantage of the indicator module 23 is that it reliably indicates the position of the diaphragm rather than indicating the position of, for example, a portion of the drive assembly. Prior art indicators have in general indicated the position of a portion of the drive assembly of the valve, and although this is satisfactory if the valve is operating normally it is possible for a fault to develop within the valve resulting in a false indication of the position of the diaphragm.

Figure 4:
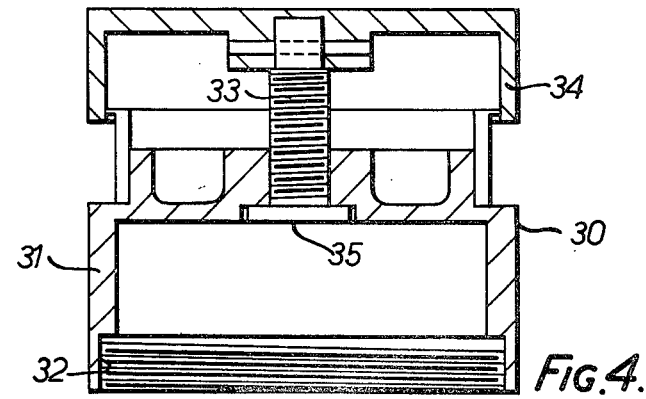
FIG. 4 is a sectional view of a hand wheel module.

Turning now to FIG. 4 an alternative drive assembly or module 30 is shown. The drive assembly 30 includes a body 31 having screw threads 32 for engagement with the threads 16 of the clamping member. A spindle 33 is screw-threadedly engaged with the body 31 and carries a hand wheel 34. When the drive assembly 30 is mounted on the clamping member 10 the end face 35 of the spindle 33 engages the end face 14 of the operating member 13, and rotation of the hand wheel 34 causes axial movement of the spindle which depresses the operating member 13 to close the valve. When the hand wheel is rotated in the opposite direction the return spring 15 maintains the faces 14 and 35 in contact.

Figure 3:
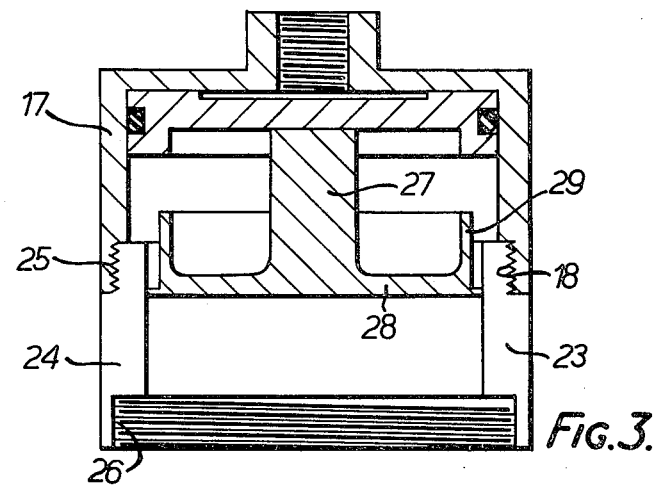
FIG. 3 is a sectional view of the piston module of FIG. 2 coupled to an indicator module.

It will be appreciated that the drive assembly 30 can be used in conjunction with the indicator module 23 illustrated in FIG. 3 if desired.

Figure 5:
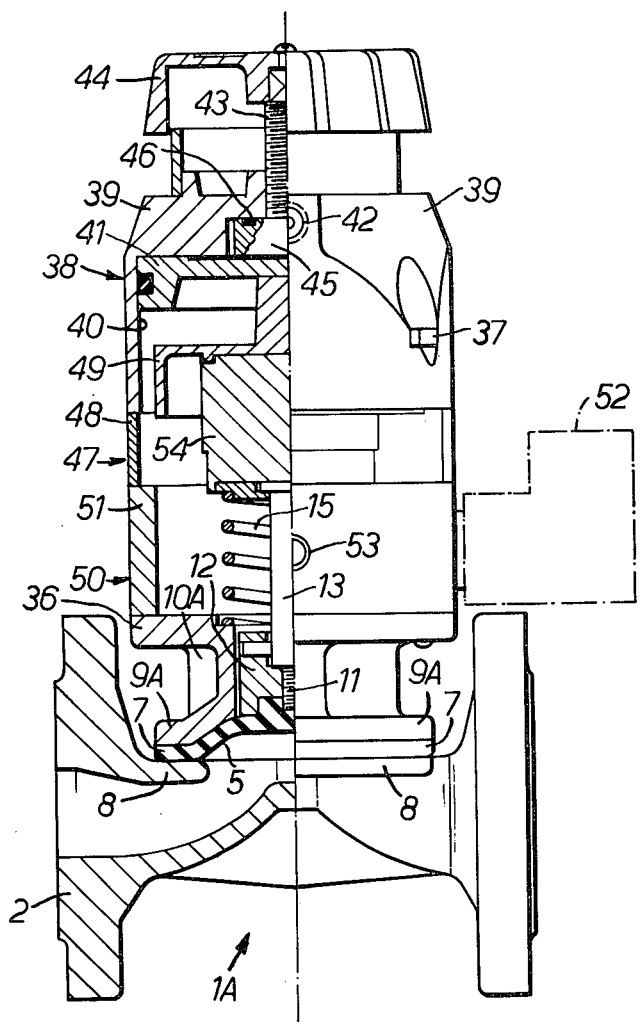
FIG. 5 is a half-sectional view of a modified embodiment including a combined piston/hand wheel module coupled to an indicator module.

Referring now to FIG. 5 a modified embodiment of the invention is shown. The modified embodiment comprises a valve sub-assembly 1A including a valve body 2 and diaphragm 5 the same as those shown in FIG. 1. The periphery 7 of the diaphragm is sandwiched between the flange 8 on the valve body and a flange 9A on a clamping member 10A. The clamping member 10A is secured to the body flange 8 by means of studs and nuts (not shown) and holds the lower face of the periphery 7 of the diaphragm in sealing engagement with the body flange 8. The upper end of the clamping member 10A is provided with an outwardly directed flange 36 having a plurality of threaded holes to receive fastening screws 37, only one of which is shown in FIG. 5. The remaining components of the valve sub-assembly 1A are substantially as described above with reference to the valve sub-assembly 1, and have been allotted the same reference numerals.

A drive assembly 38 is secured to the flange 36 by screws 37 and comprises a body 39 in which is defined a cylinder 40 housing a piston 41. A threaded connection 42 is provided on the side of the body 39 for directing pressurised working fluid, for example air, into the cylinder 40 to drive the piston 41 along the cylinder and close the valve, generally as described above with reference to FIG. 2.

The upper end of the body 39 is provided with a threaded bore in which is mounted a threaded spindle 43. The upper end of the spindle 43 carries a hand wheel 44 and the lower end of the spindle is provided with a head 45 in which is mounted an O-ring seal 46. When the spindle 43 is in the fully raised position shown in FIG. 5 the O-ring seal 46 engages a shoulder machined on the body 39 to seal the upper end of the cylinder 40, and the piston 41 can move freely within the cylinder 40 under the influence of pressurised fluid within the cylinder 40 and the return spring 15. However, if it is desired to close the valve manually the hand wheel 44 can be rotated the rotate the spindle 43 and thereby move the head 45 along the cylinder 40 driving the piston with it and manually closing the valve.

The drive assembly 38 is provided with an indicator module 47 comprising a clear plastics sleeve 48 and an indicator member 49. The indicator module 47 functions in a manner similar to the indicator module 23 described above to provide a visual indication of the state of opening of the valve.

An accessory module 50 is positioned between the sleeve 48 of the indicator module and the flange 36 on the clamping member. The accessory module comprises a cast metal sleeve 51 having the same peripheral shape as the flange 36, the sleeve 48 and the lower part of the body 39 to provide a smooth exterior profile to the assembled modules. Although the sleeve 51 plays no role in the functioning of the valve it does provide a convenient mounting point for various accessories which may be required. For example a cycle counter to count the number of operating cycles through which the valve moves, a manually controlled pilot valve for controlling the flow of air to the cylinder 40, a solenoid controlled pilot valve for controlling the flow of air to the cylinder 40, or a position detector, for example a proximity detector or one or more micro-switches. One such accessory is indicated in broken lines at 52. In the preferred embodiment, the external transverse cross sectional shape of the sleeve 51, sleeve 48, and lower part of body 39 is generally square with the fasteners 37 passing through apertures formed in the corners of the various components. In this case, each of the four faces of the sleeve 51 may be pre-drilled to receive a particular accessory or accessories. By way of example, a hole 53 may be provided in one face of the sleeve 51 to accommodate a proximity detector.

When the accessory module 50 is used a spacer 54 is positioned between the operating member 13 and the indicator member 49.

Figure 6:
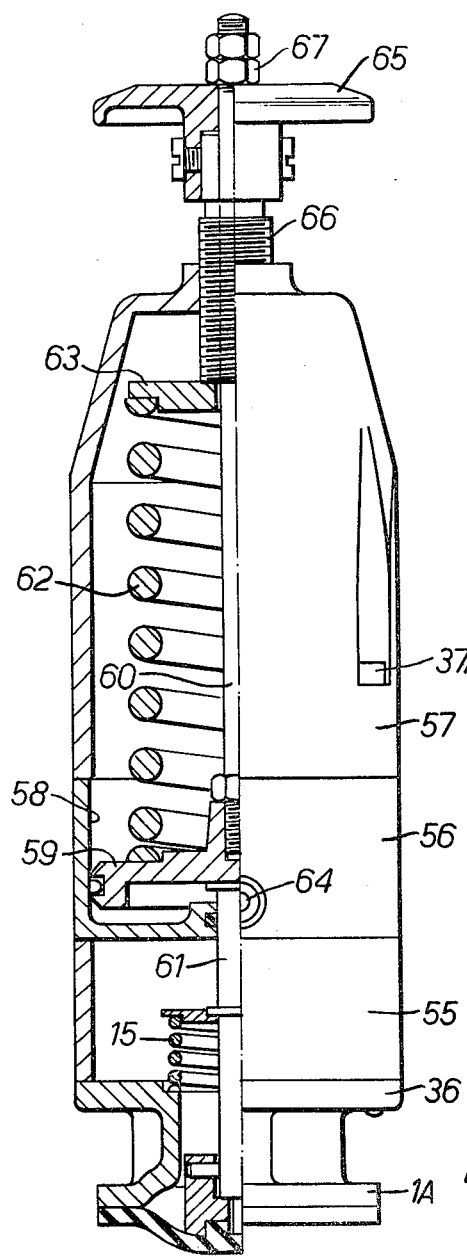
FIG. 6 is a half-sectional view of part of a spring closing valve.

Referring now to FIG. 6 a spring closing valve with emergency hand wheel opening is illustrated, the valve body having been omitted in the interests of clarity.

The valve shown in FIG. 6 includes a valve sub-assembly 1A as described above with reference to FIG. 1 on top of which is positioned an assembly comprising a sleeve 55, air actuation module 56 and spring cover 57. The various components of the assembly are in abutting engagement with each other, and are held assembled on the flange 36 of the valve sub-assembly by means of screws 37A. The air actuation module 56 defines a cylinder 58 in which is slidably mounted a piston 59. The upper end of the piston is connected to a guide rod 60 and the lower end of the piston abuts a spindle 61. O-ring seals are provided to seal between the piston 59 and the cylinder 58, and between the spindle 61 and the end wall of the module 56. A compression spring 62 extends between the piston 59 and a plate 63 located in the upper part of the spring cover 57. The spring 62 imposes a downward force on the piston 59 sufficient to overcome the bias of the spring 15 and the line pressure of the flow controlled by the valve, and accordingly the valve is normally held closed under spring pressure. Under normal conditions, the valve is opened by admitting compressed air to the cylinder 58 via a port 64, and thereby driving the piston 59 upwardly to compress the spring 62. As the piston rises under the influence of air pressure the spring 15 moves the valve towards the open position.

In order to provide for emergency manual opening of the valve a hand wheel 65 is secured to a spindle 66 which is in screw-threaded engagement with the upper end of the spring cover 57. The rod 60 projects through the spindle 66 and hand wheel 65 and is provided at its upper end with a nut 67 which abuts the upper surface of the hand wheel when the piston is in its lowest normal working position, i.e. as shown in FIG. 6.

Under normal operating conditions as the piston 59 rises under the influence of air pressure in the cylinder 58 the rod 60 projects progressively further above the hand wheel 65 to provide a visual indication of the state of opening of the valve. In order to open the valve under emergency conditions the hand wheel 65 is rotated to rotate the spindle 66. The lower end of the spindle 66 is in abutting engagement with the spring plate 63, and as the hand wheel is rotated to move the spindle 66 upwardly as viewed in FIG. 6 the plate 63 also moves upwardly under the influence of spring 62. At the same time, because of the engagement of the nuts 67 with the upper surface of the hand wheel 65 the rod 60 is moved upwardly to draw the piston 59 upwardly and allow the valve to open under the influence of spring 15.

It will be appreciated that the above described components enable a full range of valves to be produced and offered by a valve manufacturer more easily than previously. The valve sub-assemblies 1 or 1A can be mass produced economically and the cost of maintaining a stock of assorted drive assemblies is less than maintaining a stock of drive assemblies each incorporating a complete bonnet and compressor mechanism. Further, the completion of a valve by inter-connecting a suitable drive assembly with a valve sub-assembly and any other desired modules is easily carried out by unskilled workers. Also, the drive assemblies can be removed from the valve sub-assembly without disturbing the connection between the clamping member 10, 10A and the valve body and thus without disturbing the seal between the diaphragm and the valve body. Accordingly, the drive assemblies may be removed for service or replacement by new or different drive assemblies without draining down the fluid system in which the valve is incorporated, and without the difficulty of re-sealing and testing any fluid joints.

Various modules may optionally be incorporated between the drive assembly and the clamping member. By designing all such modules to have the same external shape as the adjacent parts of the clamping member and drive assembly a valve of unitary appearance is produced, i.e. the finished valve looks as if it was designed as a single unit rather than as an assembly of parts.

We claim:

1. A diaphragm valve comprising first and second self-contained sub-assemblies:
   (a) the first sub-assembly comprising:
      (1) a valve body defining a flow passage and a diaphragm opening:
      (2) a diaphragm closing the diaphragm opening and movable between a closed position in which the diaphragm is in engagement with a seat formed in the flow passage to close the flow passage to fluid flow and an open position in which the diaphragm is spaced from the seat and the passage is open to fluid flow;
      (3) a diaphragm clamping member;
      (4) means securing the diaphragm clamping member to the valve body for clamping the periphery of the diaphragm in fluid-tight contact with the surface of the body surrounding the diaphragm opening; and (5) an operating member in engagement with the diaphragm and mounted for axial movement relative to the clamping member towards the seat to move the diaphragm towards the closed position;

(b) the second sub-assembly comprising:

(1) a drive assembly releasably secured to the clamping member by means separate from said securing means, the drive assembly including force means selectively operable to apply a force to the operating member towards the seat to move the diaphragm towards the closed position, said force means being separable with said drive assembly from a force applying relationship with respect to said operating member upon release of said drive assembly from said clamping member and without requiring separation of any component of either of said sub-assemblies from its respective sub-assembly and said first sub-assembly being constructed and arranged so as to be capable of remaining in its fully operable condition relative to said flow passage upon separation of said second sub-assembly from said first sub-assembly.

2. A diaphragm valve according to claim 1 wherein the force means is in abutting contact with the operating member.

3. A diaphragm valve according to claim 2 wherein a spring is provided to bias the operating member in a direction away from the seat and thereby maintain the abutting contact between the operating member and the force means.

4. A diaphragm valve according to claim 3 wherein the spring is a compression spring located between the clamping member and the operating member.

5. A diaphragm valve according to claim 1 wherein the drive assembly includes a body defining a cylinder, and wherein the force means includes a piston slidingly and sealingly mounted in the cylinder for driving the operating member towards the seat in response to the admission of pressurised working fluid to the cylinder.

6. A diaphragm valve according to claim 5 wherein a spindle is in screw-threaded engagement with the body and is provided with a handwheel rotation of which causes the spindle to force the piston towards the seat and thus drive the operating member towards the seat and the diaphragm towards the closed position.

7. A diaphragm valve according to claim 1 wherein the drive assembly includes a body, and wherein the force means comprises a spindle in screw-threaded engagement with the body, the spindle being provided with a handwheel rotation of which causes the spindle to move axially relative to the body and drive the operating member towards the seat.

8. A diaphragm valve according to claim 1 wherein the drive assembly is secured directly to the clamping member.

9. A diaphragm valve according to claim 1 wherein an indicator module is positioned between the drive assembly and the clamping member.

10. A diaphragm valve according to claim 9 wherein the indicator module includes an indicator member the position of which is indicative of the position of the diaphragm, and a body housing the indicator member and through which the indicator member is visible.

11. A diaphragm valve according to claim 1 wherein an accessory module is positioned between the drive assembly and the clamping member.

* * * * *